US010078969B2

(12) United States Patent
McClard et al.

(10) Patent No.: US 10,078,969 B2
(45) Date of Patent: Sep. 18, 2018

(54) MUSIC TEACHING SYSTEM (71) Applicant: Intel Corporation, Santa Clara, CA (US)

(72) Inventors: Anne P. McClard, Portland, OR (US); Aimee Knier, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/421,066

(22) Filed: Jan. 31, 2017

(65) Prior Publication Data

US 2018/0218634 A1  Aug. 2, 2018

(51) Int. Cl.
G09B 15/00 (2006.01)
G09B 15/02 (2006.01)
G10H 1/00 (2006.01)
G09B 15/04 (2006.01)
G09B 5/06 (2006.01)
(Continued)

(52) U.S. Cl.
CPC ....... *G09B 15/023* (2013.01); *G06F 3/04886* (2013.01); *G09B 5/065* (2013.01); *G09B 15/04* (2013.01); *G10H 1/0008* (2013.01); *G06F 3/0482* (2013.01); *G06F 2203/04808* (2013.01); *G10H 2220/096* (2013.01)

(58) Field of Classification Search
CPC .......... H04N 5/23222; H04N 21/4307; H04N 2005/4408; G06T 2207/10016; G10K 2210/3219; G10H 1/368; G10H 2220/135; G10H 2220/401; G10H 2220/106
See application file for complete search history.

(56) References Cited

U.S. PATENT DOCUMENTS 6,841,724 B2  1/2005 George
7,696,421 B1* 4/2010 Charles .............. G10D 13/08
                                                84/411 R
(Continued)

FOREIGN PATENT DOCUMENTS

KR  20100120363 A  11/2010

OTHER PUBLICATIONS

"Mat-A-Matics", Mat-A-Matics TM a B. Lively toy by B. toys, [Online]. Retrieved from the Internet: <URL: http://www.mybtoys.com/toys/lively/mat-a-matics/>, (Accessed on Jul. 11, 2017), 1 pg.
(Continued)

*Primary Examiner* — Marlon Fletcher
(74) *Attorney, Agent, or Firm* — Schwegman Lundberg & Woessner, P.A.

(57) ABSTRACT

A gaming platform including a touch panel having a contact surface that a user may contact to operate the gaming platform to perform a gaming function. A plurality of touch regions divides the contact surface into a plurality of discrete regions. Each touch region may correspond to a different gaming function such that contacting the contact surface of the touch panel within a particular touch region causes the gaming platform to perform a corresponding gaming function. The gaming platform may include a plurality of touch regions each corresponding to the gaming platform playing a different musical note. In this configuration, each touch region may correspond to a key, string, striking surface, or other musical part for playing a particular musical note.

26 Claims, 8 Drawing Sheets (51) Int. Cl.
*G06F 3/0488* (2013.01)
*G06F 3/0482* (2013.01)

(56) References Cited

U.S. PATENT DOCUMENTS

| | | | | |
|---|---|---|---|---|
| 8,539,368 B2* | 9/2013 | Nam | | G06F 3/011 |
| | | | | 463/36 |
| 8,987,573 B1* | 3/2015 | Lippens | | G09B 15/002 |
| | | | | 84/423 R |
| 2005/0045024 A1 | 3/2005 | Sagastegui | | |
| 2010/0064880 A1 | 3/2010 | Takehisa et al. | | |
| 2011/0100198 A1* | 5/2011 | Gatzsche | | G10H 1/0008 |
| | | | | 84/615 |
| 2011/0185880 A1* | 8/2011 | Charles | | G09B 15/02 |
| | | | | 84/477 R |
| 2012/0160079 A1* | 6/2012 | Little | | G10H 1/38 |
| | | | | 84/613 |
| 2012/0174736 A1* | 7/2012 | Wang | | G10H 1/0008 |
| | | | | 84/622 |
| 2013/0186260 A1* | 7/2013 | Velho | | G09B 15/02 |
| | | | | 84/645 |
| 2014/0083279 A1* | 3/2014 | Little | | G10H 1/0008 |
| | | | | 84/609 |
| 2015/0248878 A1* | 9/2015 | Lippens | | G10G 1/00 |
| | | | | 84/483.2 |
| 2016/0019810 A1* | 1/2016 | Rodriguez | | G09B 15/009 |
| | | | | 84/478 |

OTHER PUBLICATIONS

"Musical Walking Mat", Jolly Jumpers Model No. 101, [Online]. [accessed on Aug. 11, 2016]. Retrieved from the Internet: <URL: www.jollyjumper.com/show/253>, (accessed on Aug. 11, 2016), 3 pgs.

* cited by examiner

MUSIC TEACHING SYSTEM

TECHNICAL FIELD

This document pertains generally, but not by way of limitation, to an apparatus and system for teaching music theory.

BACKGROUND

Floor rugs or play mats for children or music students often have visual representations of musical keys or symbols for teaching musical theory. The musical keys are commonly arranged in a linear form factor such as a piano keyboard, xylophone, or other "scale" form factors that depict a series of musical keys. While scale form factors may visually correspond to the musical keys to actual instruments, patterns that exist within musical notes, such as chords and scales, may not be readily apparent from the scale form factors common on floor rugs and play mats. The limited surface area of floor rugs and play mats limit the number of musical keys and scales that are depicted on the floor mats, which may make determining musical patterns difficult. Also, as the scale form factors frequently correspond to actual instruments, students may be unable to associate learned musical patterns to different instruments and be forced to relearn the same musical theory for each new instrument.

BRIEF DESCRIPTION OF THE DRAWINGS

In the drawings, which are not necessarily drawn to scale, like numerals may describe similar components in different views. Like numerals having different letter suffixes may represent different instances of similar components. The drawings generally illustrate, by way of example, but not by way of limitation, various embodiments discussed in the present document.

DETAILED DESCRIPTION

The present inventors have recognized, among other things, that a problem to be solved can include that the small surface areas and commonly employed scale form factors of floor rugs or play mats used to teach musical theory to teach students making recognizing musical patterns difficult. In an example, the present subject matter can provide a solution to this problem, such as by providing a gaming platform including a touch panel having a contact surface that a user may contact to operate the gaming platform to perform a gaming function. A plurality of touch regions divides the contact surface into a plurality of discrete regions. Each touch region may correspond to a different gaming function such that contacting the contact surface of the touch panel within a particular touch region causes the gaming platform to perform a corresponding gaming function. For example, a gaming platform may include a plurality of touch regions each corresponding to the gaming platform playing a different musical note. In this configuration, each touch region may correspond to a key, string, striking surface, or other musical part for playing a particular musical note.

In an example, touch regions may be positioned in touch region clusters according to the relationship between the clustered touch regions. For example, touch regions for playing musical notes may be clustered into touch region clusters based on musical scales. The physical and visual clustering of the related touch regions may assist in the cognitive association of musical keys or notes represented by the touch regions. The touch regions may be arranged in the cluster to correspond how the associated musical notes are typically taught or played on a musical instrument.

In an example, each touch region may include a border sub-region that may be contacted by the user to cause the gaming platform perform a secondary function related to the gaming function assigned to the touch region. For example, a user may contact the border sub-region of a touch region for playing a musical note to cause the gaming platform to play an accidental a sharp or a flat, of the musical note.

In an example, related touch regions with a shared secondary function may be positioned adjacent each other. In this configuration, the secondary function may be operated by contacting the border sub-regions of adjacent touch regions. For example, touch regions for an adjacent musical note can be positioned adjacent each other within a touch region clusters. The border sub-regions of the adjacent touch regions may be simultaneously contacted to play the shared accidental of the two musical notes.

This overview is intended to provide an overview of subject matter of the present patent application. It is not intended to provide an exclusive or exhaustive explanation of the present subject matter. The detailed description is included to provide further information about the present patent application.

Figure 1:
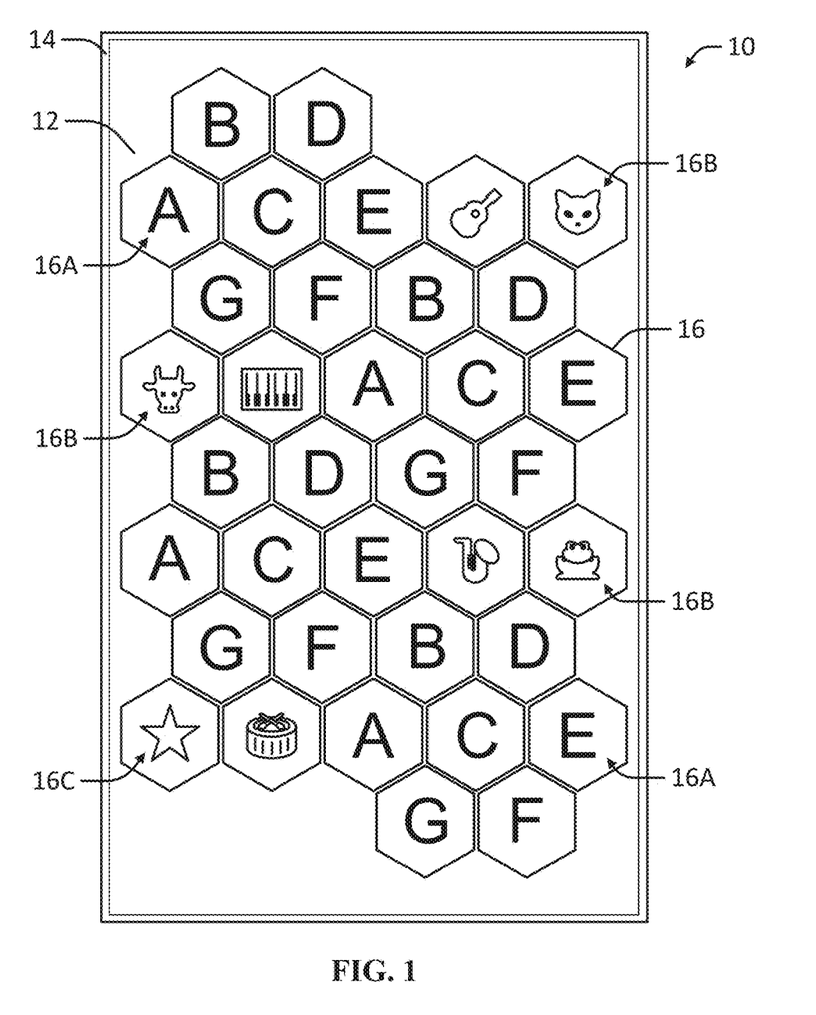
FIG. 1 is a schematic diagram of a gaming platform according to an example of the present disclosure.

As depicted in FIG. 1, a gaming platform 10 for teaching music theory and pattern recognition, according to an example, may include a touch panel 12 that may be contacted by a user's hand, foot or other part to interact with the gaming platform 10 and initiate a gaming function. The gaming platform 10 may be a rigid platform, a flexible mat or rug, or other planar structure. The touch panel 12 may be a capacitive touch device configured to detect when the user's body contacts the touch panel 12. The touch panel 12 can include a plurality of sensors that may detect the changes in capacitance resulting from contact with the user's body part to pinpoint the point of contact on the contact surface and initiate at least one gaming function based on the location of the point of contact. In certain examples, the gaming platform 10 may include a non-touch sensitive border 14.

As depicted in FIG. 1, the touch panel 12 may be divided into a plurality of discrete regions by a plurality of touch regions 16. Each touch region 16 may correspond to a particular gaming function (e.g. sounding a musical note) such that contacting the touch panel 12 within the touch region 16 causes the gaming platform 10 to perform the corresponding gaming function. In an example, the plurality of touch regions 16 can be depicted on a conductive cover positioned over the touch panel 12. The conductive cover can be transparent, semi-transparent, or opaque. In certain examples, the touch panel 12 can be transparent and positioned over a display presenting the plurality of touch regions 16. In this configuration, the touch regions 16 depicted can be varied depending on the operation of the touch panel 12.

As illustrated in FIG. 1, in an example, the plurality of touch regions 16 can include at least one general touch region 16A corresponding to a general gaming function. For example, each general touch region 16A may correspond to the gaming platform 10 playing a different musical note. In this configuration, the user may contact a general touch region 16A to play a musical note or touch multiple general touch regions 16A to play multiple musical notes as a musical cord.

As illustrated in FIG. 1, in an example, the plurality of touch regions 16 may include at least one special touch region 16B corresponding to a special gaming function. The special gaming function may include a series of actions. For example, contacting the touch panel 12 within a special touch region 16B causes the gaming platform 10 to play a sound effect or a tune. The special gaming function may include altering the assigned functions of the general touch regions 16A. For example, contacting the touch panel 12 within a special touch region 16B such that contacting a general touch region 16A will play the same musical note with a different simulated instrument. The gaming platform 10 may be configured to maintain the altered functions of the general touch regions 16A as long as the special touch region 16B is contacted. Alternatively, the gaming platform 10 may be configured to maintain the altered functions of the general touch regions 16A until the special touch region 16B is contacted again.

As illustrated in FIG. 1, in an example, the plurality of touch regions 16 can include at least one menu touch region 16C corresponding to a menu or operating function such as power, menu, setting, and other background functions. The gaming platform 10 may be configured to alter the assigned functions of the general touch regions 16A when a menu touch region 16B is contacted. For example, a menu touch region 16C may be contacted to change the function of a corresponding general touch region 16A to a control function for operating a menu or other function. In this configuration, the user can use a single menu touch region 16C with a plurality of general touch regions 16A to operate background and operating functions of the gaming platform 10. The gaming platform 10 may be configured to maintain the altered functions of the general touch regions 16A as long as the menu touch region 16C is contacted. Alternatively, the gaming platform 10 may be configured to maintain the altered functions of the general touch regions 16A until the menu touch region 16C is contacted again.

Figure 2:
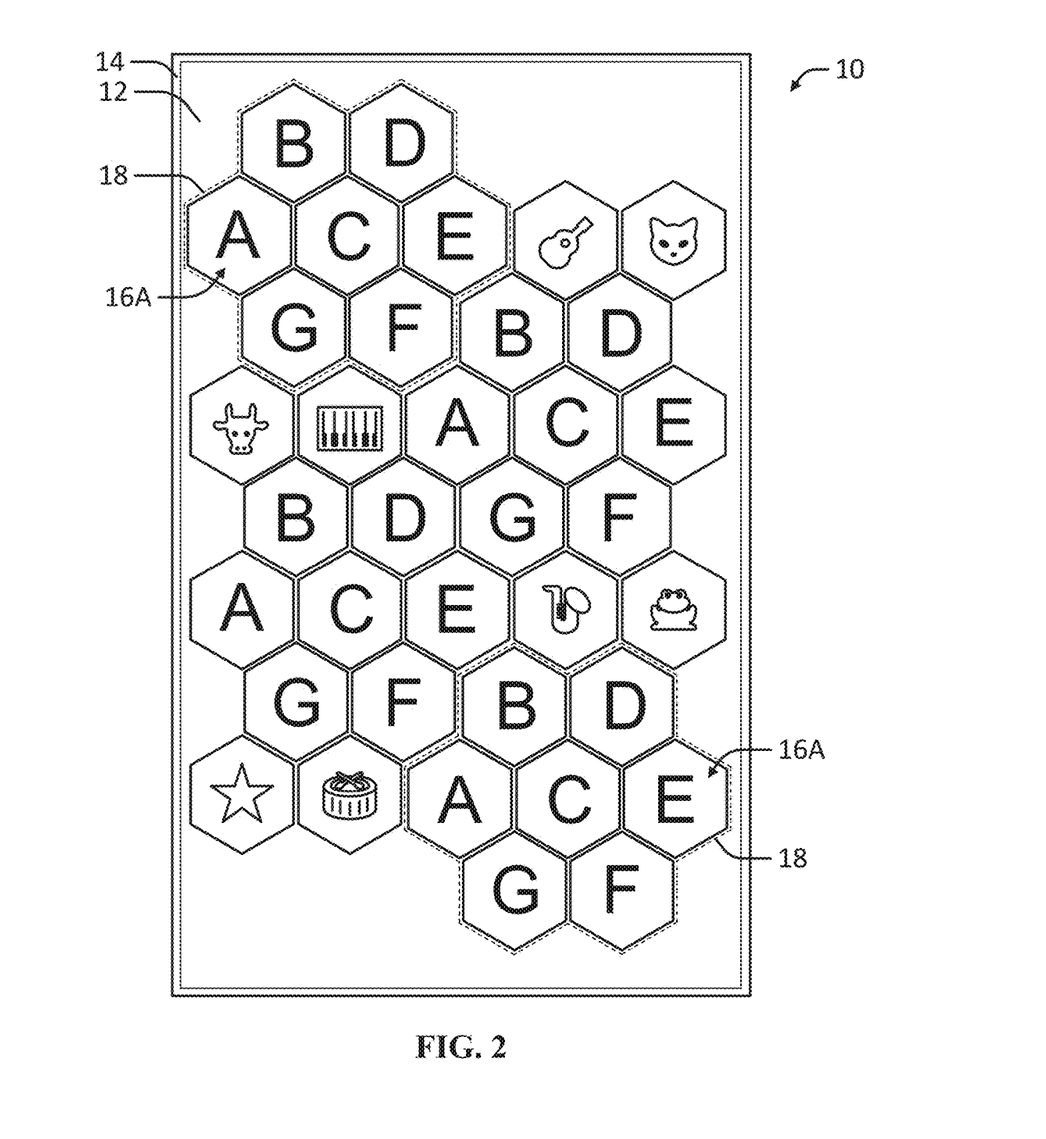
FIG. 2 is a schematic diagram of the gaming platform depicted in FIG. 1 illustrating touch region clusters according to an example of the present disclosure.

As depicted in FIG. 2, in an example, a plurality of general touch regions 16A may be positioned on the touch panel 10 in a touch region cluster 18 comprising a plurality of general touch regions 16A. Each touch region cluster 18 may comprise general touch regions 16A having related gaming functions. For example, the general touch regions 16A for playing the musical notes of a musical scale may be grouped into a touch region cluster 18. The physical and visual clustering of the related touch regions may assist in the cognitive association of musical keys or notes represented by the general touch regions 16A.

As illustrated in FIG. 2, in an example, the general touch regions 16A may have hexagonal shapes. In this configuration, a touch region cluster 18 may have a general touch region 16A in the center with six general touch regions 16A arranged around the center general touch region 16A. The general touch regions 16A may be arranged in the touch region cluster 18 to correspond how the associated musical notes are typically taught or played on a musical instrument. For example, as depicted in FIG. 2, the touch region cluster 18 is centered on a general touch region 16A corresponding to play a C note, which is a common note to begin playing the musical notes of a scale on a piano. Alternatively, for example, the touch region cluster 18 may be centered on a general touch region 16A corresponding to play a G note, which a common note to begin playing the musical notes of a scale on a guitar.

Figure 3:
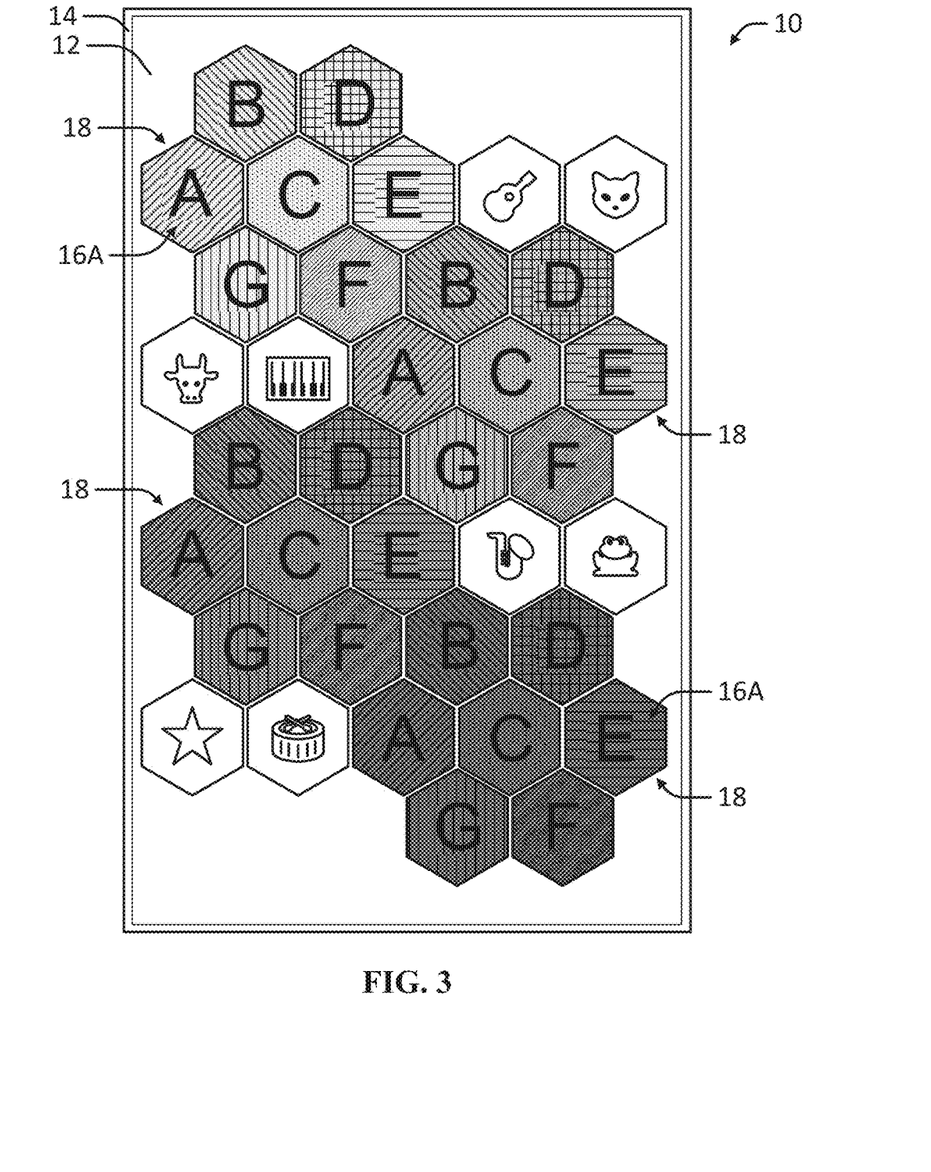
FIG. 3 is a schematic diagram of the gaming platform depicted in FIG. 1 illustrating interrelating corresponding touch regions of different touch region clusters and identifying different touch region clusters according to an example of the present disclosure.

As illustrated in FIGS. 1-3, in an example, each general touch region 16A may be uniquely identified with an identifier. In an example, the As illustrated in FIGS. 2 and 3, in an example, the touch panel 12 may include a plurality of touch region clusters 18. Each touch region cluster 18 may include a plurality of general touch regions 16A corresponding to the same set of general gaming functions. In an example, the general touch region 16A having the same general gaming function in each touch region cluster 18 can have the same color or pattern for identification of that general gaming function in that touch region cluster 18 as illustrated in FIG. 3. For example, general touch regions 16A for playing musical notes may be clustered into touch region clusters 18 corresponding to musical scales. In this configuration, the general touch regions 16A for playing the same musical note in each musical scale may have the same color or pattern.

As illustrated in FIG. 3, in an example, the touch panel 10 may include a plurality of touch region clusters 18. Each touch region cluster 18 may correspond to different general gaming functions of the general touch regions 16A clustered within each touch region cluster 18. As illustrated in FIG. 3, in an example, the different touch region clusters 18 may have different colors or shading to differentiate the touch region clusters 18. For example, general touch regions 16A for playing musical notes may be clustered into touch region clusters 18 corresponding to musical scales. In this configuration, the intensity of the color of each touch region cluster 18 may be increased or decrease to correspond to higher or lower octaves, respectively, represented by the touch region cluster.

Figure 4:
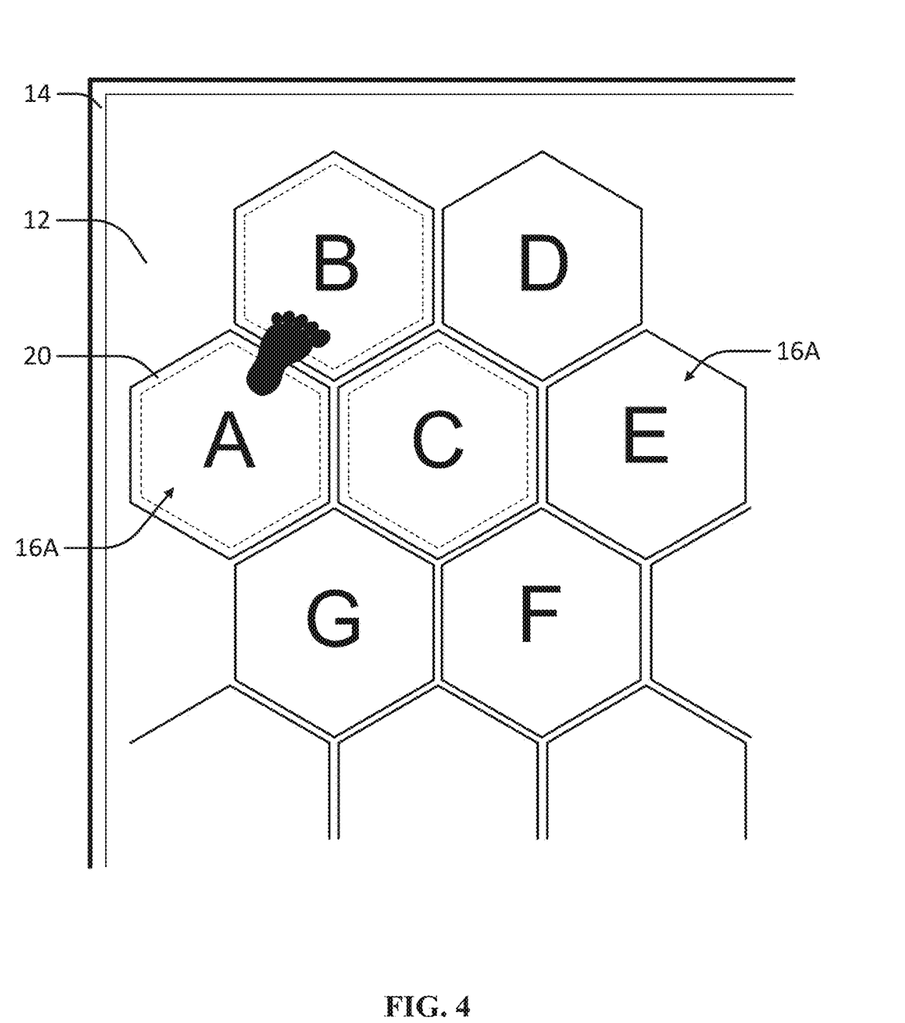
FIG. 4 is a partial schematic diagram of a gaming platform illustrating interaction with more than one touch region according to an example of the present disclosure.

As depicted in FIG. 4, in an example, each general touch region 16A may include a border sub-region 20 that may be contacted by the user to cause the gaming platform 10 to perform a secondary function related to the gaming function assigned to the general touch region 16A. For example, a user may contact the border sub-region 20 of a general touch region 16A for playing a musical note to cause the gaming platform 10 to play an accidental a sharp or a flat, of the assigned musical note.

In an example, related general touch regions 16A with a shared secondary function may be positioned adjacent each other. As depicted in FIG. 4, the border sub-region 20 may be a circumferential border on the general touch region 16A. In this configuration, the secondary function may be operated by contacting the border sub-regions 20 of adjacent general touch regions 16A. For example, general touch regions 16A for adjacent musical notes can be positioned adjacent each other within a touch region clusters 18. The border sub-regions 20 of the adjacent general touch regions 16A may be simultaneously contacted to play the shared accidental of the two musical notes.

Figure 5A:
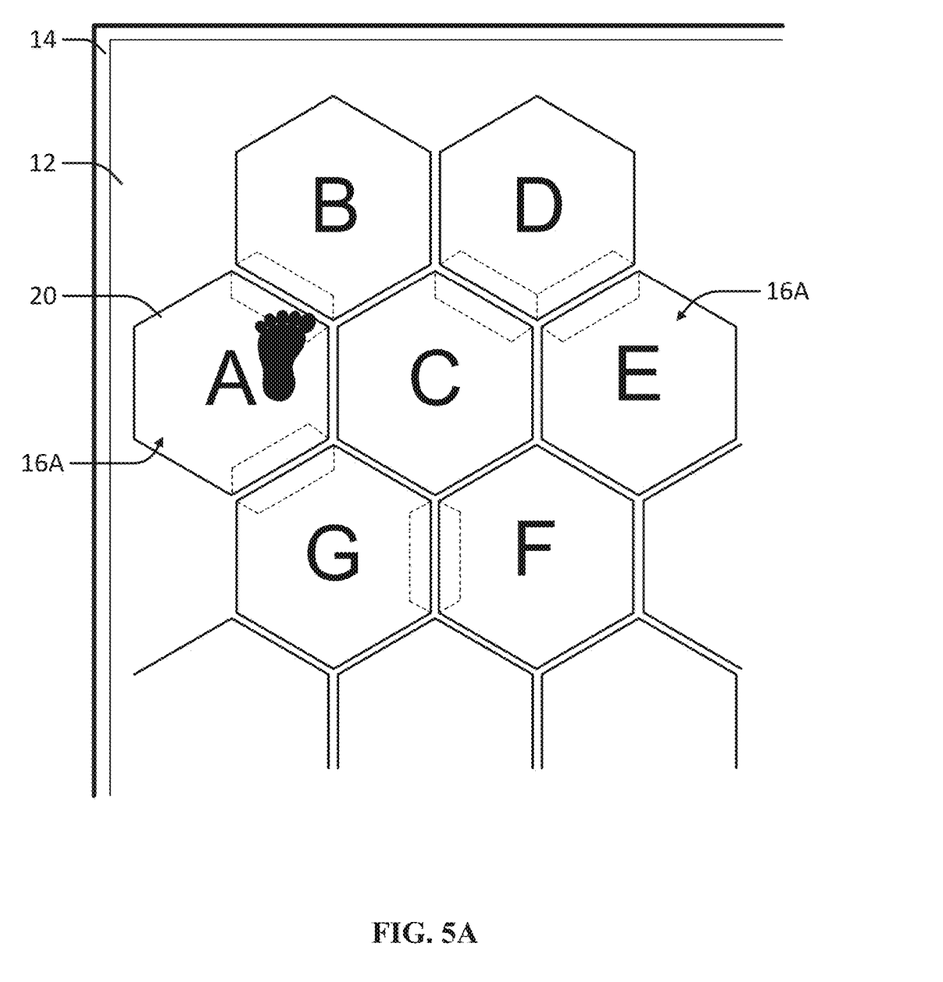
FIG. 5A is a partial schematic diagram of a gaming platform illustrating interaction with a sub-region of a touch region according to an example of the present disclosure.
Figure 5B:
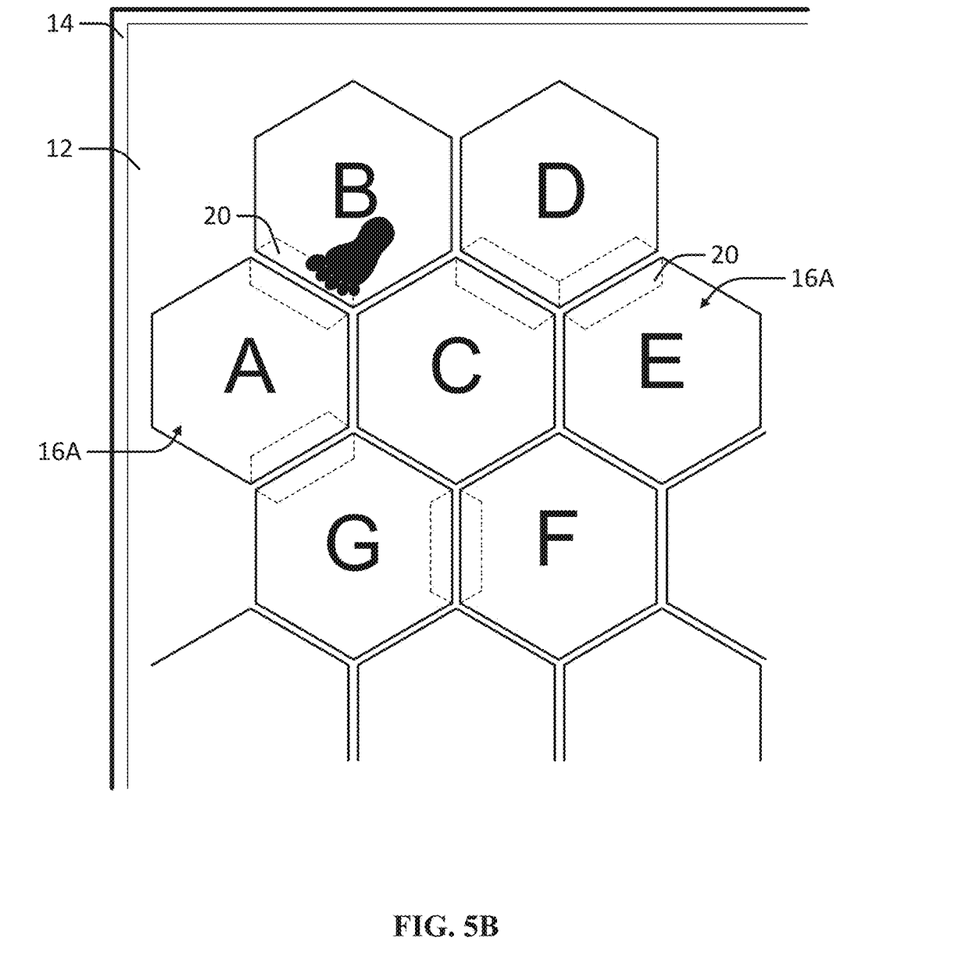
FIG. 5B is a partial schematic diagram of a gaming platform illustrating interaction with a sub-region of a touch region according to an example of the present disclosure.

As depicted in FIGS. 5A-5B, in an example, each general touch region 16A may include a plurality of border sub-regions 20. In this configuration, a user may contact the border sub-region 20 of a first general touch region 16A proximate a second general touch region 16A that shares a secondary function with the first general touch region 16A to access the secondary function. For example, a first general touch region 16A for a first musical note and a second general touch region 16A can be positioned adjacent each other within a touch region clusters 18. As illustrated in FIG. 5A, the border sub-region 20 of the first general touch region 16A adjacent the second general touch region 16A can be contacted to play the shared accidental of the two musical notes. As illustrated in FIG. 5B, the border sub-region 20 of the second general touch region 16A adjacent the first general touch region 16A can be contacted to play the shared accidental of the two musical notes. This arrangement can facilitate reinforcement that an accidental tone is a tone between two musical notes.

Figure 5C:
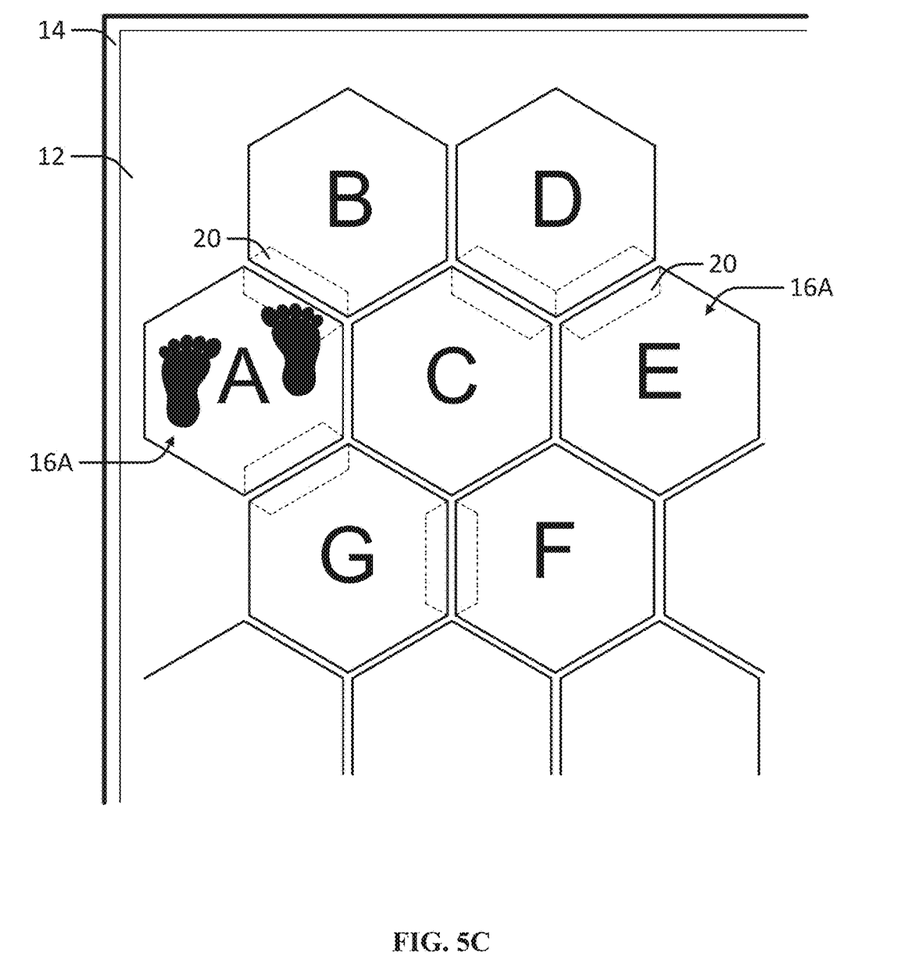
FIG. 5C is a partial schematic diagram of a gaming platform illustrating multiple contacts with a single touch region according to an example of the present disclosure.

As illustrated in FIG. 5C, in certain examples, the general touch region 16A and the border sub-region 20 may be simultaneously connected to perform both the primary gaming function and the secondary gaming function simultaneously. For example, the general touch region 16A for playing a musical note and the border sub-region 20 for playing an accidental tone can be simultaneously contacted to play both the musical note and the accidental tone as a chord.

Figure 6:
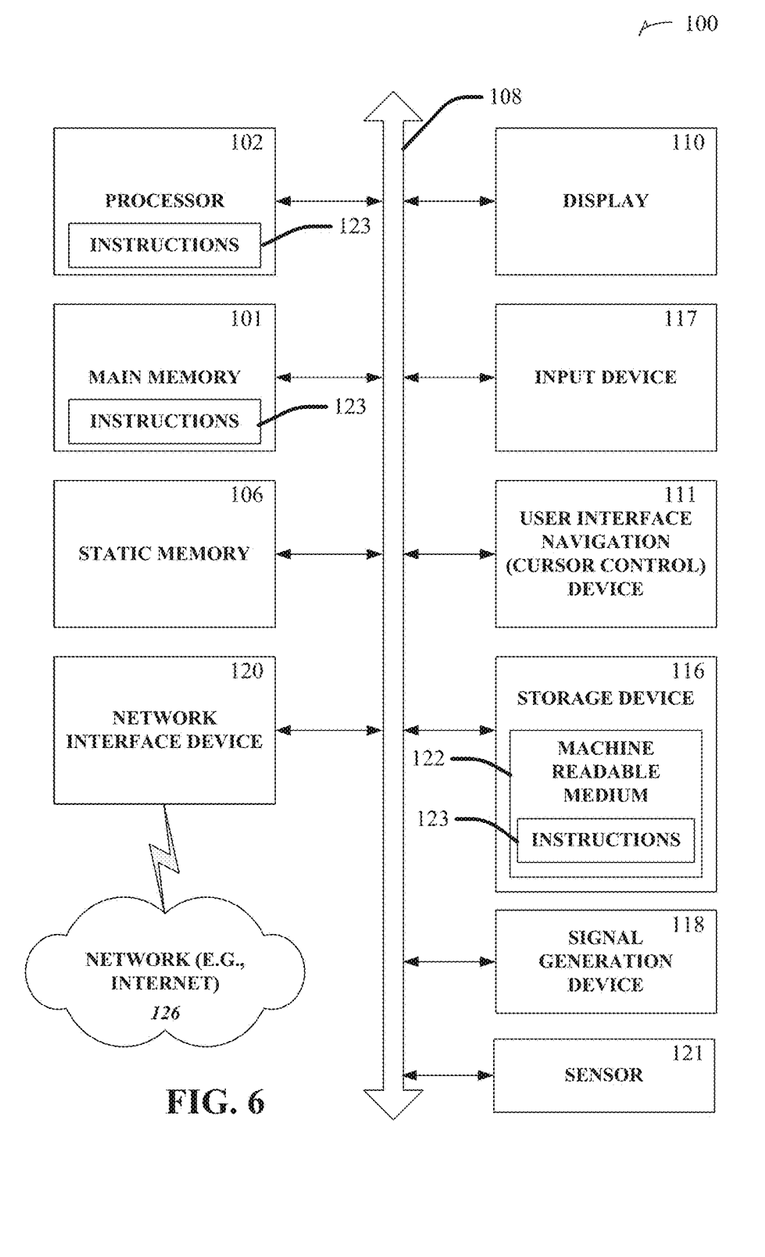
FIG. 6 is a schematic diagram illustrating an example controller module for running any one or more of the methodologies discussed herein.

FIG. 6 is a block diagram illustrating a machine in the example form of a computer system 100, within which a set or sequence of instructions may be executed to cause the machine to perform any one or more of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 100 includes at least one processor 102 (e.g., a central processing unit (CPU), a graphics processing unit (GPU) or both, processor cores, compute nodes, etc.), a main memory 104 and a static memory 106, which communicate with each other via a link 108 (e.g., bus). The computer system 100 may further optionally include a video display unit 110, an alphanumeric input device 112 (e.g., a keyboard), and a user interface (UI) navigation device 114 (e.g., a mouse). In an embodiment, the video display unit 110, input device 112 and UI navigation device 114 are incorporated into a touch screen display. The computer system 100 may additionally optionally include a storage device 116 (e.g., a drive unit), a signal generation device 118 (e.g., a speaker), a network interface device 120, and one or more sensors (not shown), such as a global positioning system (GPS) sensor, compass, accelerometer, gyrometer, magnetometer, infrared, camera. Hall effect magnetic sensor, ultrasound, or other sensor.

The storage device 116 includes a machine-readable medium 122 on which is stored one or more sets of data structures and instructions 124 (e.g., software) embodying or utilized by any one or more of the methodologies or functions described herein. The instructions 124 may also reside, completely or at least partially, within the main memory 104, static memory 106, and/or within the processor 102 during execution thereof by the computer system 100, with the main memory 104, static memory 106, and the processor 102 also constituting machine-readable media.

While the machine-readable medium 122 is illustrated in an example embodiment to be a single medium, the term "machine-readable medium" may include a single medium or multiple media (e.g., a centralized or distributed database, and/or associated caches and servers) that store the one or more instructions 124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 124 may further be transmitted or received over a communications network 126 using a transmission medium via the network interface device 120 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

VARIOUS NOTES & EXAMPLES

Example 1 is a gaming platform for teaching music theory and pattern recognition, comprising: a touch panel having a contact surface configured to be contacted by a user's body part to operate the gaming platform; wherein the contact surface is divided into a plurality of touch regions, each touch region corresponding to a gaming function of the gaming platform such that contacting the contact surface within one of the touch regions initiates the corresponding gaming function; wherein a first subset of the plurality of touch regions are visually and spatially arranged on the contact surface of the touch panel in a first touch region cluster.

In Example 2, the subject matter of Example 1 optionally includes wherein the plurality of touch regions further includes: at least one general touch region that corresponds to a general gaming function; wherein the general gaming function comprises sounding a musical note.

In Example 3, the subject matter of Example 2 optionally includes wherein multiple general touch regions can be simultaneously contacted to perform multiple general gaming functions simultaneously.

In Example 4, the subject matter of any one or more of Examples 2-3 optionally include wherein the touch regions of the first touch region cluster include: a first plurality of general touch regions that each correspond to a different general gaming function, wherein the general gaming functions are sounding musical notes; wherein the first plurality of general touch regions within the first touch region cluster are configured to sound musical notes within a first musical scale.

In Example 5, the subject matter of Example 4 optionally includes wherein each of the general touch regions includes a border sub-region such that contacting the contact surface within the border sub-region initiates a secondary gaming function.

In Example 6, the subject matter of Example 5 optionally includes wherein a first general touch region for sounding a first musical note and a second general touch region for sounding a second musical note; wherein the first musical note is sequential to the second musical note within the first musical scale.

In Example 7, the subject matter of Example 6 optionally includes wherein simultaneously contacting the border sub-region of the first general touch region and the border sub-region of the second general touch region initiates a shared secondary gaming function; wherein the shared secondary gaming function comprises an accidental tone between the first and second musical notes.

In Example 8, the subject matter of any one or more of Examples 6-7 optionally include wherein contacting the border sub-region of the first general touch region proximate to the second general touch region initiates a shared secondary gaming function; wherein the shared secondary gaming function comprises an accidental tone between the first and second musical notes.

In Example 9, the subject matter of any one or more of Examples 4-8 optionally include wherein a second subset of the plurality of touch regions are visually and spatially arranged on the contact surface of the touch panel in a second touch region cluster.

In Example 10, the subject matter of Example 9 optionally includes wherein the touch regions of the second touch region cluster includes: a second plurality of general touch regions that each correspond to a different general gaming function, wherein the general gaming functions are sounding musical notes; wherein the second plurality of general touch regions within the second touch region cluster are configured to sound musical notes within a second musical scale.

In Example 11, the subject matter of Example 10 optionally includes wherein the first musical scale is a different octave from the second musical scale.

In Example 12, the subject matter of any one or more of Examples 10-11 optionally include wherein the touch regions of the first touch region cluster and the touch regions of the second touch region cluster have a different one of a color intensity, a pattern, and a combination thereof.

In Example 13, the subject matter of any one or more of Examples 10-12 optionally include wherein a first general touch region of the first touch region cluster corresponds to a first general gaming function and a second general touch region of the second touch region cluster corresponds to a second general gaming function; wherein the first general gaming function comprises a variation of the second general gaming function.

In Example 14, the subject matter of Example 13 optionally includes wherein the first general gaming function comprises playing a musical note and the second general gaming function comprises playing the musical note at a different octave.

In Example 15, the subject matter of any one or more of Examples 13-14 optionally include wherein the first general touch region and the second general touch region share one of a color, base pattern, and a combination thereof.

In Example 16, the subject matter of any one or more of Examples 2-15 optionally include wherein the plurality of touch regions further comprises at least one special touch region that corresponds to a special gaming function.

In Example 17, the subject matter of Example 16 optionally includes wherein the special gaming function comprises a sounding a plurality of musical notes.

In Example 18, the subject matter of any one or more of Examples 16-17 optionally include wherein the special gaming function includes altering the general gaming functions of the plurality of general touch regions when the contact surface within the special touch region is contacted.

In Example 19, the subject matter of Example 18 optionally includes reverting the general gaming functions of the plurality of general touch regions when the contact with the special touch region is released.

In Example 20, the subject matter of any one or more of Examples 18-19 optionally include reverting the general gaming functions of the plurality of general touch regions when the special touch region is contacted again.

In Example 21, the subject matter of any one or more of Examples 2-20 optionally include wherein the plurality of touch regions further comprises at least one menu touch region that corresponds to a menu gaming function.

In Example 22, the subject matter of Example 21 optionally includes wherein the menu gaming function includes altering the general gaming functions of the plurality of general touch regions when the contact surface within the menu touch region is contacted.

In Example 23, the subject matter of Example 22 optionally includes reverting the general gaming functions of the plurality of general touch regions when the contact with the menu touch region is released.

In Example 24, the subject matter of any one or more of Examples 22-23 optionally include reverting the general gaming functions of the plurality of general touch regions when the menu touch region is contacted again.

In Example 25, the subject matter of any one or more of Examples 1-24 optionally include wherein the touch panel comprises a capacitive touch screen.

Example 26 is a method for teaching music theory and pattern recognition, comprising: providing a gaming platform including a touch panel having a contact surface divided into a plurality of touch regions, each touch region corresponding to a gaming function of the gaming platform; contacting the contact surface of the touch panel within one of the touch region to initiate the corresponding gaming function; wherein a first subset of the plurality of touch regions are visually and spatially arranged on the contact surface of the touch panel in a first touch region cluster.

In Example 27, the subject matter of Example 26 optionally includes contacting at least one general touch region of the plurality of touch regions to initiate a general gaming function, wherein the general gaming function comprises sounding a musical note.

In Example 28, the subject matter of Example 27 optionally includes contacting multiple general touch regions simultaneously to initiate multiple general gaming functions simultaneously.

In Example 29, the subject matter of any one or more of Examples 27-28 optionally include wherein the touch regions of the first touch region cluster include: a first plurality of general touch regions that each correspond to a different general gaming function, wherein the general gaming functions are sounding musical notes; wherein the first plurality of general touch regions within the first touch region cluster are configured to sound musical notes within a first musical scale.

In Example 30, the subject matter of Example 29 optionally includes contacting the contact surface within a border sub-region of one of the general touch regions to initiate a secondary gaming function.

In Example 31, the subject matter of Example 30 optionally includes wherein a first general touch region for sounding a first musical note and a second general touch region for sounding a second musical note; wherein the first musical note is sequential to the second musical note within the first musical scale.

In Example 32, the subject matter of Example 31 optionally includes contacting the border sub-region of the first general touch region and the border sub-region of the second general touch region simultaneously to initiate a shared secondary gaming function; wherein the shared secondary gaming function comprises an accidental tone between the first and second musical notes.

In Example 33, the subject matter of any one or more of Examples 31-32 optionally include contacting the border sub-region of the first general touch region proximate to the second general touch region to initiate a shared secondary gaming function; wherein the shared secondary gaming function comprises an accidental tone between the first and second musical notes.

In Example 34, the subject matter of any one or more of Examples 29-33 optionally include arranging a second subset of the plurality of touch regions on the contact surface of the touch panel in a second touch region cluster.

In Example 35, the subject matter of Example 34 optionally includes wherein the touch regions of the second touch region cluster includes: a second plurality of general touch regions that each correspond to a different general gaming function, wherein the general gaming functions are sounding musical notes; wherein the second plurality of general touch regions within the second touch region cluster are configured to sound musical notes within a second musical scale.

In Example 36, the subject matter of Example 35 optionally includes wherein the first musical scale is a different octave from the second musical scale.

In Example 37, the subject matter of any one or more of Examples 35-36 optionally include wherein the touch regions of the first touch region cluster and the touch regions of the second touch region cluster have a different one of a color intensity, a pattern, and a combination thereof.

In Example 38, the subject matter of any one or more of Examples 35-37 optionally include wherein a first general touch region of the first touch region cluster corresponds to a first general gaming function and a second general touch region of the second touch region cluster corresponds to a second general gaming function; wherein the first general gaming function comprises a variation of the second general gaming function.

In Example 39, the subject matter of Example 38 optionally includes wherein the first general gaming function comprises playing a musical note and the second general gaming function comprises playing the musical note at a different octave.

In Example 40, the subject matter of any one or more of Examples 38-39 optionally include wherein the first general touch region and the second general touch region share one of a color, base pattern, and a combination thereof.

In Example 41, the subject matter of any one or more of Examples 27-40 optionally include contacting the contact surface within at least one special touch region to initiate a secondary gaming function.

In Example 42, the subject matter of Example 41 optionally includes wherein the special gaming function comprises a sounding a plurality of musical notes.

In Example 43, the subject matter of any one or more of Examples 41-42 optionally include wherein the special gaming function includes altering the general gaming functions of the plurality of general touch regions when the contact surface within the special touch region is contacted.

In Example 44, the subject matter of Example 43 optionally includes releasing contact with the special touch region to revert the general gaming functions of the plurality of general touch regions.

In Example 45, the subject matter of any one or more of Examples 43-44 optionally include contacting the special touch region again to revert the general gaming functions of the plurality of general touch regions.

In Example 46, the subject matter of any one or more of Examples 27-45 optionally include contacting the contact surface within at least one menu touch region to initiate a menu gaming function.

In Example 47, the subject matter of Example 46 optionally includes wherein the menu gaming function includes altering the general gaming functions of the plurality of general touch regions when the contact surface within the menu touch region is contacted.

In Example 48, the subject matter of Example 47 optionally includes releasing contact with the menu touch region to revert the general gaming functions of the plurality of general touch regions.

In Example 49, the subject matter of any one or more of Examples 47-48 optionally include contacting the menu touch region again to revert the general gaming functions of the plurality of general touch regions.

In Example 50, the subject matter of any one or more of Examples 26-49 optionally include wherein the touch panel comprises a capacitive touch screen.

Example 51 is an apparatus comprising means for performing any of the methods of Examples 26-50.

Example 52 is at least one machine-readable medium including instructions, which when executed by a machine, cause the machine to perform operations of any of the methods of Examples 26-50.

Example 53 is an apparatus for teaching music theory and pattern recognition, comprising: means for providing a gaming platform including a touch panel having a contact surface divided into a plurality of touch regions, each touch region corresponding to a gaming function of the gaming platform; means for contacting the contact surface of the touch panel within one of the touch region to initiate the corresponding gaming function; wherein a first subset of the plurality of touch regions are visually and spatially arranged on the contact surface of the touch panel in a first touch region cluster.

In Example 54, the subject matter of Example 53 optionally includes means for contacting at least one general touch region of the plurality of touch regions to initiate a general gaming function; wherein the general gaming function comprises sounding a musical note.

In Example 55, the subject matter of any one or more of Examples 53-54 optionally include means for contacting multiple general touch regions simultaneously to initiate multiple general gaming functions simultaneously.

In Example 56, the subject matter of any one or more of Examples 53-55 optionally include wherein the touch regions of the first touch region cluster include: a first plurality of general touch regions that each correspond to a different general gaming function, wherein the general gaming functions are sounding musical notes; wherein the first plurality of general touch regions within the first touch region cluster are configured to sound musical notes within a first musical scale.

In Example 57, the subject matter of Example 56 optionally includes means for contacting the contact surface within a border sub-region of one of the general touch regions to initiate a secondary gaming function.

In Example 58, the subject matter of Example 57 optionally includes wherein a first general touch region for sounding a first musical note and a second general touch region for sounding a second musical note; wherein the first musical note is sequential to the second musical note within the first musical scale.

In Example 59, the subject matter of Example 58 optionally includes means for contacting the border sub-region of the first general touch region and the border sub-region of the second general touch region simultaneously to initiate a shared secondary gaming function.

In Example 60, the subject matter of any one or more of Examples 58-59 optionally include means for contacting the border sub-region of the first general touch region proximate to the second general touch region to initiate a shared secondary gaming function; wherein the shared secondary gaming function comprises an accidental tone between the first and second musical notes.

In Example 61, the subject matter of any one or more of Examples 56-60 optionally include means for arranging a second subset of the plurality of touch regions on the contact surface of the touch panel in a second touch region cluster.

In Example 62, the subject matter of Example 61 optionally includes wherein the touch regions of the second touch region cluster includes: a second plurality of general touch regions that each correspond to a different general gaming function, wherein the general gaming functions are sounding musical notes; wherein the second plurality of general touch regions within the second touch region cluster are configured to sound musical notes within a second musical scale.

In Example 63, the subject matter of Example 62 optionally includes wherein the first musical scale is a different octave from the second musical scale.

In Example 64, the subject matter of any one or more of Examples 62-63 optionally include wherein the touch regions of the first touch region cluster and the touch regions of the second touch region cluster have a different one of a color intensity, a pattern, and a combination thereof.

In Example 65, the subject matter of any one or more of Examples 62-64 optionally include wherein a first general touch region of the first touch region cluster corresponds to a first general gaming function and a second general touch region of the second touch region cluster corresponds to a second general gaming function; wherein the first general gaming function comprises a variation of the second general gaming function.

In Example 66, the subject matter of Example 65 optionally includes wherein the first general gaming function comprises playing a musical note and the second general gaming function comprises playing the musical note at a different octave.

In Example 67, the subject matter of any one or more of Examples 65-66 optionally include wherein the first general touch region and the second general touch region share one of a color, base pattern, and a combination thereof.

In Example 68, the subject matter of any one or more of Examples 54-67 optionally include means for contacting the contact surface within at least one special touch region to initiate a secondary gaming function.

In Example 69, the subject matter of Example 68 optionally includes wherein the special gaming function comprises a sounding a plurality of musical notes.

In Example 70, the subject matter of any one or more of Examples 68-69 optionally include wherein the special gaming function includes altering the general gaming functions of the plurality of general touch regions when the contact surface within the special touch region is contacted.

In Example 71, the subject matter of Example 70 optionally includes means for releasing contact with the special touch region to revert the general gaming functions of the plurality of general touch regions.

In Example 72, the subject matter of any one or more of Examples 70-71 optionally include means for contacting the special touch region again to revert the general gaming functions of the plurality of general touch regions.

In Example 73, the subject matter of any one or more of Examples 54-72 optionally include means for contacting the contact surface within at least one menu touch region to initiate a menu gaming function.

In Example 74, the subject matter of Example 73 optionally includes wherein the menu gaming function includes altering the general gaming functions of the plurality of general touch regions when the contact surface within the menu touch region is contacted.

In Example 75, the subject matter of Example 74 optionally includes means for releasing contact with the menu touch region to revert the general gaming functions of the plurality of general touch regions.

In Example 76, the subject matter of any one or more of Examples 74-75 optionally include means for contacting the menu touch region again to revert the general gaming functions of the plurality of general touch regions.

In Example 77, the subject matter of any one or more of Examples 53-76 optionally include wherein the touch panel comprises a capacitive touch screen.

Example 78 is a gaming system for teaching music theory and pattern recognition, comprising: a touch panel having a contact surface configured to be contacted by a user's body part to operate the gaming system; and a controller configured to read computer readable instructions and configured to control operation of the sensor system, wherein the instructions for controlling operation of the sensor system comprises instructions for: dividing the contact surface into a plurality of touch regions, each touch region corresponding to a gaming function of the gaming system such that contacting the contact surface within one of the touch regions initiates the corresponding gaming function; and arranging a first subset of the plurality of touch regions on the contact surface of the touch panel in a first touch region cluster.

In Example 79, the subject matter of Example 78 optionally includes wherein the instructions for controlling operation of the sensor system comprises instructions for initiating a general gaming function when at least one general touch region of the plurality of touch regions is contacted; wherein the general gaming function comprises sounding a musical note.

In Example 80, the subject matter of Example 79 optionally includes wherein the instructions for controlling operation of the sensor system comprises instructions for initiating multiple general gaming functions simultaneously when multiple general touch regions are simultaneously contacted.

In Example 81, the subject matter of any one or more of Examples 79-80 optionally include wherein the touch regions of the first touch region cluster include: a first plurality of general touch regions that each correspond to a different general gaming function, wherein the general gaming functions are sounding musical notes; wherein the first plurality of general touch regions within the first touch region cluster are configured to sound musical notes within a first musical scale.

In Example 82, the subject matter of Example 81 optionally includes wherein the instructions for controlling operation of the sensor system comprises instructions for initiating a secondary gaming function when the contact surface within a border sub-region of one of the general touch regions is contacted.

In Example 83, the subject matter of Example 82 optionally includes wherein a first general touch region for sounding a first musical note and a second general touch region for sounding a second musical note; wherein the first musical note is sequential to the second musical note within the first musical scale.

In Example 84, the subject matter of Example 83 optionally includes wherein the instructions for controlling operation of the sensor system comprises instructions for initiating a shared secondary gaming function when the border sub-region of the first general touch region and the border sub-region of the second general touch region is simultaneously contacted; wherein the shared secondary gaming function comprises an accidental tone between the first and second musical notes.

In Example 85, the subject matter of any one or more of Examples 83-84 optionally include wherein the instructions for controlling operation of the sensor system comprises instructions for initiating a shared secondary gaming function when the border sub-region of the first general touch region proximate to the second general touch region is contacted; wherein the shared secondary gaming function comprises an accidental tone between the first and second musical notes.

In Example 86, the subject matter of any one or more of Examples 81-85 optionally include wherein the instructions for controlling operation of the sensor system comprises instructions for arranging a second subset of the plurality of touch regions on the contact surface of the touch panel in a second touch region cluster.

In Example 87, the subject matter of Example 86 optionally includes wherein the touch regions of the second touch region cluster includes: a second plurality of general touch regions that each correspond to a different general gaming function, wherein the general gaming functions are sounding musical notes; wherein the second plurality of general touch regions within the second touch region cluster are configured to sound musical notes within a second musical scale.

In Example 88, the subject matter of Example 87 optionally includes wherein the first musical scale is a different octave from the second musical scale.

In Example 89, the subject matter of any one or more of Examples 87-88 optionally include wherein the touch regions of the first touch region cluster and the touch regions of the second touch region cluster have a different one of a color intensity, a pattern, and a combination thereof.

In Example 90, the subject matter of any one or more of Examples 87-89 optionally include wherein a first general touch region of the first touch region cluster corresponds to a first general gaming function and a second general touch region of the second touch region cluster corresponds to a second general gaming function; wherein the first general gaming function comprises a variation of the second general gaming function.

In Example 91, the subject matter of Example 90 optionally includes wherein the first general gaming function comprises playing a musical note and the second general gaming function comprises playing the musical note at a different octave.

In Example 92, the subject matter of any one or more of Examples 90-91 optionally include wherein the first general touch region and the second general touch region share one of a color, base pattern, and a combination thereof.

In Example 93, the subject matter of any one or more of Examples 79-92 optionally include wherein the instructions for controlling operation of the sensor system comprises instructions for initiating a secondary gaming function when the contact surface within at least one special touch region is contacted.

In Example 94, the subject matter of Example 93 optionally includes wherein the special gaming function comprises a sounding a plurality of musical notes.

In Example 95, the subject matter of any one or more of Examples 93-94 optionally include wherein the instructions for controlling operation of the sensor system comprises instructions for altering the general gaming functions of the plurality of general touch regions when the contact surface within the special touch region is contacted.

In Example 96, the subject matter of Example 95 optionally includes wherein the instructions for controlling operation of the sensor system comprises instructions for reverting the general gaming functions of the plurality of general touch regions when contact with the special touch region is released.

In Example 97, the subject matter of any one or more of Examples 95-96 optionally include wherein the instructions for controlling operation of the sensor system comprises instructions for reverting the general gaming functions of the plurality of general touch regions when the special touch region is contacted again.

In Example 98, the subject matter of any one or more of Examples 79-97 optionally include wherein the instructions for controlling operation of the sensor system comprises instructions for initiating a menu gaming function when the contact surface within at least one menu touch region is contacted.

In Example 99, the subject matter of Example 98 optionally includes wherein the instructions for controlling operation of the sensor system comprises instructions for altering the general gaming functions of the plurality of general touch regions when the contact surface within the menu touch region is contacted.

In Example 100, the subject matter of Example 99 optionally includes wherein the instructions for controlling operation of the sensor system comprises instructions for: reverting the general gaming functions of the plurality of general touch regions when the menu touch region is contacted again.

In Example 101, the subject matter of any one or more of Examples 99-100 optionally include wherein the instructions for controlling operation of the sensor system comprises instructions for reverting the general gaming functions of the plurality of general touch regions when the menu touch region is contacted again.

In Example 102, the subject matter of any one or more of Examples 78-101 optionally include wherein the touch panel comprises a capacitive touch screen.

Each of these non-limiting examples can stand on its own, or can be combined in any permutation or combination with any one or more of the other examples.

The above-detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second." and "third." etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

What is claimed is:

1. A gaming platform for teaching music theory and pattern recognition, comprising:
   a touch panel having a contact surface configured to be contacted by a user's body part to operate the gaming platform;
   wherein the contact surface is divided into a plurality of touch regions, each touch region corresponding to a gaming function of the gaming platform such that contacting the contact surface within one of the touch regions initiates the corresponding gaming function;
   wherein a first subset of the plurality of touch regions are visually and spatially arranged on the contact surface of the touch panel in a first touch region cluster, wherein the first subset of touch regions includes a center touch region and a plurality of ring touch regions surrounding the center touch region to form the first touch region cluster,
   wherein the plurality of ring touch regions includes a first ring touch region and a second ring touch region adjacent to the first ring touch region, wherein the first ring touch region is configured to initiate a first musical note, and wherein the second ring touch region is configured to initiate a second musical note, wherein the second musical note is sequential to the first musical note.

2. A method for teaching music theory and pattern recognition, comprising:
   providing a gaming platform including a touch panel having a contact surface divided into a plurality of touch regions, each touch region corresponding to a gaming function of the gaming platform;
   contacting the contact surface of the touch panel within one of the touch regions to initiate the corresponding gaming function, wherein a first subset of the plurality of touch regions are visually and spatially arranged on the contact surface of the touch panel in a first touch region cluster, the first subset of touch regions including a center touch region and a plurality of ring touch regions surrounding the center touch region to form the first touch region cluster, wherein the plurality of ring touch regions includes a first ring touch region and a second ring touch region adjacent to the first ring touch region, wherein contacting the first ring touch region corresponds to a first gaming function that initiates playing a first musical note, and wherein contacting the second ring touch region corresponds to a second gaming function that initiates playing a second musical note, wherein the second musical note is sequential to the first musical note.

3. The method of claim 2, further comprising:
contacting at least one general touch region of the plurality of touch regions to initiate a general gaming function, wherein the general gaming function comprises sounding a musical note.

4. The method of claim 3, further comprising:
contacting multiple general touch regions simultaneously to initiate multiple general gaming functions simultaneously.

5. The method of claim 3, wherein the touch regions of the first touch region cluster include:
a first plurality of general touch regions that each correspond to a different general gaming function, wherein the general gaming functions are sounding musical notes;
wherein the first plurality of general touch regions within the first touch region cluster are configured to sound musical notes within a first musical scale.

6. The method of claim 5, further comprising:
contacting the contact surface within a border sub-region of one of the general touch regions to initiate a secondary gaming function.

7. The method of claim 6, wherein a first general touch region for sounding a first musical note and a second general touch region for sounding a second musical note;
wherein the first musical note is sequential to the second musical note within the first musical scale.

8. The method of claim 7, further comprising:
contacting the border sub-region of the first general touch region and the border sub-region of the second general touch region simultaneously to initiate a shared secondary gaming function;
wherein the shared secondary gaming function comprises an accidental tone between the first and second musical notes.

9. The method of claim 7, further comprising:
contacting the border sub-region of the first general touch region proximate to the second general touch region to initiate a shared secondary gaming function;
wherein the shared secondary gaming function comprises an accidental tone between the first and second musical notes.

10. The method of claim 5, further comprising:
arranging a second subset of the plurality of touch regions on the contact surface of the touch panel in a second touch region cluster.

11. The method of claim 10, wherein the touch regions of the second touch region cluster includes:
a second plurality of general touch regions that each correspond to a different general gaming function, wherein the general gaming functions are sounding musical notes;

wherein the second plurality of general touch regions within the second touch region cluster are configured to sound musical notes within a second musical scale.

12. The method of claim of 11, wherein the first musical scale is a different octave from the second musical scale.

13. The method of claim 11, wherein a first general touch region of the first touch region cluster corresponds to a first general gaming function and a second general touch region of the second touch region cluster corresponds to a second general gaming function;
wherein the first general gaming function comprises a variation of the second general gaming function.

14. The method of claim 13, wherein the first general gaming function comprises playing a musical note and the second general gaming function comprises playing the musical note at a different octave.

15. The method of claim 13, wherein the first general touch region and the second general touch region share one of a color, base pattern, and a combination thereof.

16. The method of claim 3, further comprising:
contacting the contact surface within at least one special touch region to initiate a secondary gaming function.

17. The method of claim 16, wherein the special gaming function includes altering the general gaming functions of the plurality of general touch regions when the contact surface within the special touch region is contacted.

18. The method of claim 17, further comprising:
releasing contact with the special touch region to revert the general gaming functions of the plurality of general touch regions.

19. The method of claim 17, further comprising:
contacting the special touch region again to revert the general gaming functions of the plurality of general touch regions.

20. The method of claim 3, further comprising:
contacting the contact surface within at least one menu touch region to initiate a menu gaming function.

21. The method of claim 20, wherein the menu gaming function includes altering the general gaming functions of the plurality of general touch regions when the contact surface within the menu touch region is contacted.

22. The method of claim 21, further comprising:
releasing contact with the menu touch region to revert the general gaming functions of the plurality of general touch regions.

23. The method of claim 21, further comprising:
contacting the menu touch region again to revert the general gaming functions of the plurality of general touch regions.

24. The gaming platform of claim 1, wherein the touch regions are hexagonal;
wherein the first subset of touch regions comprises six ring touch regions arranged around the center touch region.

25. The method of claim 2, wherein the touch regions are hexagonal;
wherein the first subset of touch regions comprises six ring touch regions arranged around the center touch region.

26. The method of claim 11, wherein the touch regions of the first touch region cluster and the touch regions of the second touch region cluster have a different one of a color intensity, a pattern, and a combination thereof.

* * * * *